US012762477B2

(12) United States Patent
Agrawal et al.

(10) Patent No.: US 12,762,477 B2
(45) Date of Patent: Oct. 13, 2026

(54) MACHINE LEARNING MODEL GENERATION FOR TIME DEPENDENT DATA

(71) Applicant: Oracle International Corporation, Redwood Shores, CA (US)

(72) Inventors: Vikas Agrawal, Hyderabad (IN); Karthik Bangalore Mani, Bengaluru (IN); Krishnan Ramanathan, Kadubeesanahalli (IN)

(73) Assignee: Oracle International Corporation, Redwood Shores, CA (US)

( * ) Notice: Subject to any disclaimer, the term of this patent is extended or adjusted under 35 U.S.C. 154(b) by 599 days.

(21) Appl. No.: 18/233,975

(22) Filed: Aug. 15, 2023

(65) Prior Publication Data

US 2025/0013911 A1 Jan. 9, 2025

Related U.S. Application Data

(60) Provisional application No. 63/524,949, filed on Jul. 5, 2023.

(51) Int. Cl.
*G06N 20/00* (2019.01)

(52) U.S. Cl.
CPC .................................. *G06N 20/00* (2019.01)

(58) Field of Classification Search
CPC .................................................... G06N 20/00
See application file for complete search history.

(56) References Cited

U.S. PATENT DOCUMENTS

| | | | | |
|---|---|---|---|---|
| 10,726,356 B1 * | 7/2020 | Zarandioon | ............ | G06N 20/00 |
| 10,824,940 B1 * | 11/2020 | Rybakov | .................. | G06N 3/08 |
| 11,227,192 B1 * | 1/2022 | Rahnama-Moghaddam | .............. | G06F 18/2193 |
| 11,922,310 B1 * | 3/2024 | Juang | ..................... | G06N 3/045 |
| 2019/0102718 A1 | 4/2019 | Agrawal et al. | | |
| 2019/0147371 A1 * | 5/2019 | Deo | ....................... | G06N 20/00 706/12 |
| 2020/0098055 A1 * | 3/2020 | O'Hara | ............. | G06Q 30/0202 |
| 2021/0117993 A1 * | 4/2021 | Jumper | ............. | G06Q 30/0202 |

(Continued)

OTHER PUBLICATIONS

Sharma Aminish, et al. CA 3089459, Predicting Delay in a Process, Published Jul. 23, 2020. (Year: 2020).*

(Continued)

*Primary Examiner* — Barbara M Level
(74) *Attorney, Agent, or Firm* — Potomac Law Group, PLLC

(57) ABSTRACT

Embodiments generate a machine learning ("ML") model. Embodiments receive training data, the training data including time dependent data and a plurality of dates corresponding to the time dependent data. Embodiments date split the training data by two or more of the plurality of dates to generate a plurality of date split training data. For each of the plurality of date split training data, embodiments split the date split training data into a training dataset and a corresponding testing dataset using one or more different ratios to generate a plurality of train/test splits. For each of the train/test splits, embodiments determine a difference of distribution between the training dataset and the corresponding testing dataset. Embodiments then select the train/test split with a smallest difference of distribution and train and test the ML model using the selected train/test split.

20 Claims, 10 Drawing Sheets

(56) References Cited

U.S. PATENT DOCUMENTS

| | | | | |
|---|---|---|---|---|
| 2021/0117995 | A1* | 4/2021 | Kansara | G06N 5/01 |
| 2022/0004919 | A1* | 1/2022 | Zhang | G06F 18/2431 |
| 2022/0237103 | A1 | 7/2022 | Agrawal et al. | |
| 2025/0014097 | A1* | 1/2025 | Agrawal | G06Q 40/12 |

OTHER PUBLICATIONS

Castan-Lascorz et al., "A new hybrid method for predicting univariate and multivariate time series based on pattern forecasting", Information Sciences, vol. 586, pp. 611-627, Dec. 8, 2021.

International Search Report and Written Opinion for International Application No. PCT/US2024/013090 dated May 28, 2024.

Sksujanislam, "Multivariate Time Series Forecasting Using LSTM", Medium.com, , 20 pgs, Jan. 2022.

Unknown., "Splitting Time Series Data into Train/Test/Validation Sets", Cross Validated, 4 pgs, Jan. 6, 2023.

Yin et al., "Experimental Study of Multivariate Time Series Forecasting Models", Proceedings of the Sigchi Conference on Human Factors in Computing Systems, pp. 2833-2839, Nov. 3, 2019.

* cited by examiner 501 75 RECEIPT_DATE

| STAGE | MIN_RT | RT_01_PC | RT_05_PC | RT_10_PC | RT_20_PC | RT_30_PC | RT_40_PC | RT_50_PC | RT_60_PC | RT_70_PC | RT_80_PC | RT_90_PC | RT_95_PC | RT_99_PC | RT_100_PCTILE | | |
|---|---|---|---|---|---|---|---|---|---|---|---|---|---|---|---|---|---|
| TEST | 74 | 90 | 129 | 159 | 208 | 223 | 239 | 253 | 264 | 293 | 315 | 365 | 413 | 510 | 636 | | |
| TRAIN | 0 | 2 | 5 | 6 | 14 | 27 | 41 | 57 | 71 | 106 | 142 | 173 | 203 | 286 | 404 | | |
| | -74 | -88 | -124 | -153 | -194 | -196 | -198 | -196 | -193 | -187 | -173 | -192 | -210 | -224 | | | |
| | 37 | 46 | 67 | 82.5 | 111 | 125 | 140 | 155 | 167.5 | 199.5 | 228.5 | 269 | 308 | 398 | | | |
| | -200 | -191.30435 | -185.07463 | -185.45455 | -174.77477 | -156.8 | -141.42857 | -126.45161 | -115.22388 | -93.734336 | -75.71116 | -71.375465 | -68.181818 | -56.281407 | | (1,841.80) | 486.90 |

502 75 PROMISED_DATE

| STAGE | MIN_RT | RT_01_PC | RT_05_PC | RT_10_PC | RT_20_PC | RT_30_PC | RT_40_PC | RT_50_PC | RT_60_PC | RT_70_PC | RT_80_PC | RT_90_PC | RT_95_PC | RT_99_PC | RT_100_PCTILE | | |
|---|---|---|---|---|---|---|---|---|---|---|---|---|---|---|---|---|---|
| TEST | 3 | 77 | 131 | 154 | 201 | 218 | 236 | 248 | 267 | 296 | 315 | 369 | 414 | 510 | 636 | | |
| TRAIN | 0 | 2 | 5 | 6 | 14 | 28 | 43 | 58 | 76 | 112 | 148 | 179 | 224 | 293 | 419 | | |
| | | -75 | -126 | -148 | -187 | -190 | -193 | -190 | -191 | -184 | -167 | -190 | -190 | -217 | | | |
| | | 39.5 | 68 | 80 | 107.5 | 123 | 139.5 | 153 | 171.5 | 204 | 231.5 | 274 | 319 | 401.5 | | | |
| | | -189.87342 | -185.29412 | -185 | -173.95349 | -154.47154 | -138.35125 | -124.18301 | -111.37026 | -90.196078 | -72.138229 | -69.343066 | -59.561129 | -54.047325 | | (1,607.78) | 479.91 |

503 75 PO_APPROVED_DATE

| STAGE | MIN_RT | RT_01_PC | RT_05_PC | RT_10_PC | RT_20_PC | RT_30_PC | RT_40_PC | RT_50_PC | RT_60_PC | RT_70_PC | RT_80_PC | RT_90_PC | RT_95_PC | RT_99_PC | RT_100_PCTILE | | |
|---|---|---|---|---|---|---|---|---|---|---|---|---|---|---|---|---|---|
| TEST | 1 | 2 | 4 | 8 | 25 | 55 | 94 | 153 | 206 | 236 | 251 | 304 | 329 | 383 | 420 | | |
| TRAIN | 0 | 2 | 5 | 8 | 22 | 41 | 57 | 77 | 120 | 156 | 197 | 262 | 308 | 444 | 636 | | |
| | -1 | 0 | 1 | 0 | -3 | -14 | -37 | -76 | -86 | -80 | -54 | -42 | -21 | 61 | | | |
| | 0.5 | 2 | 4.5 | 8 | 23.5 | 48 | 75.5 | 115 | 163 | 196 | 224 | 283 | 318.5 | 413.5 | | | |
| | -200 | 0 | 22.2222222 | 0 | -12.765957 | -29.166667 | -49.006623 | -66.086957 | -52.760736 | -40.816327 | -24.107143 | -14.840989 | -6.5934066 | 14.7521161 | | (259.17) | 117.43 |

510 511 513 514 515 520 521 530 531 532 541 542 560 562

Fig. 5

MACHINE LEARNING MODEL GENERATION FOR TIME DEPENDENT DATA

CROSS REFERENCE TO RELATED APPLICATIONS

This application claims priority to U.S. Provisional Patent Application Ser. No. 63/524,949 filed on Jul. 5, 2023, the disclosure of which is hereby incorporated by reference.

FIELD

One embodiment is directed generally to a machine learning model, and in particular to the generation of a machine learning model.

BACKGROUND INFORMATION

The process of generating or building a machine learning ("ML") model includes multiple steps. The steps include gathering a suitable dataset for training the model and preprocessing the data by performing tasks such as cleaning, normalizing, and transforming it to a suitable format for training. Then the dataset is divided or split into two or three parts: the training set, validation set, and the test set. The training set is used to train the model, the validation set helps in tuning hyperparameters and assessing model performance, and the test set is used for final evaluation.

A ML model architecture/algorithm is then chosen that is adapted for the problem being solved with machine learning. The problem can be classification, regression, clustering, or any other type of problem. The chosen model can be a decision tree, random forest, support vector machine, neural network, or any other model depending on the nature of the data and problem.

The training set is then used to train the chosen model and the validation set is used to evaluate the model's performance. Once the model's performance is satisfactory, the model is evaluated using the test set. This provides an unbiased estimate of the model's performance and its ability to generalize to new data. Finally, the model can be deployed, and its performance can be monitored over time and adjustments or re-training made as needed.

SUMMARY

Embodiments generate a machine learning ("ML") model. Embodiments receive training data, the training data including time dependent data and a plurality of dates corresponding to the time dependent data. Embodiments date split the training data by two or more of the plurality of dates to generate a plurality of date split training data. For each of the plurality of date split training data, embodiments split the date split training data into a training dataset and a corresponding testing dataset using one or more different ratios to generate a plurality of train/test splits. For each of the train/test splits, embodiments determine a difference of distribution between the training dataset and the corresponding testing dataset. Embodiments then select the train/test split with a smallest difference of distribution and train and test the ML model using the selected train/test split.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 5 illustrates a simple example of the functionality of in accordance to embodiments.

DETAILED DESCRIPTION

Embodiments generate a machine learning ("ML") model using a time dependent dataset that is time split for use for training data, testing data and validation data. Embodiments create vector markers and determine vector distances to automatically determine how the distribution of the dataset is different between training and testing/validation, and which specific date variable to perform the time split on, in order to optimize the performance of the generated model. Embodiments address the problem of inadvertent distributional shifts across train, test and validation datasets simply due to a sub-optimal choice of splitting date variable for time splits. Embodiments determine which is the best date (e.g., purchased order approved date, promised delivery date, transaction date, payment due date, payment received date, etc.) to split on for Train/Test datasets by determining the greatest similarity of Distribution between train/test datasets.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
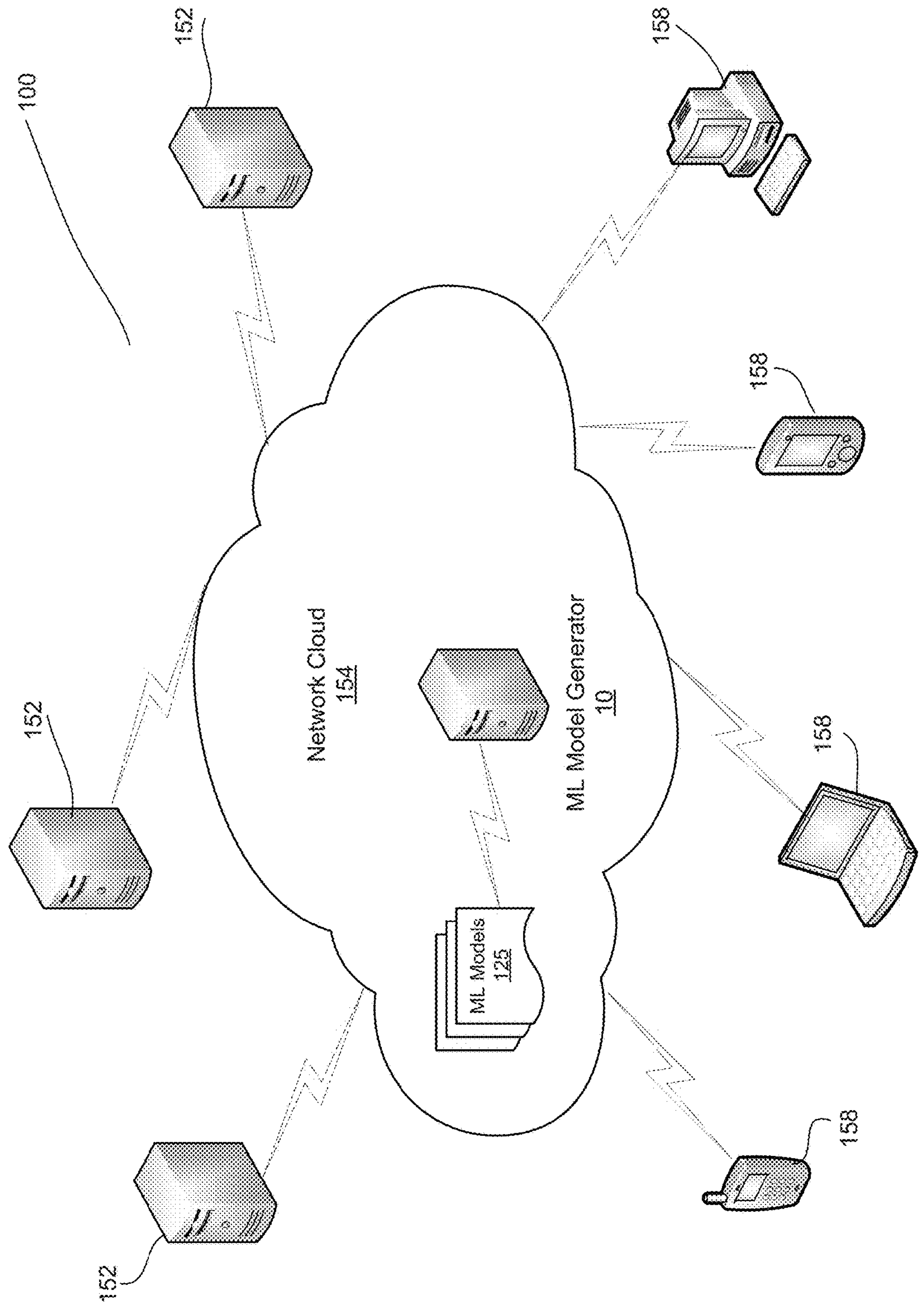
FIG. 1 illustrates an example of a system that includes a machine learning ("ML") model generator system in accordance to embodiments.

FIG. 1 illustrates an example of a system 100 that includes an ML model generator system 10 in accordance with embodiments. ML model generator system 10 may be implemented within a computing environment that includes a communication network/cloud 154. Network 154 may be a private network that can communicate with a public network (e.g., the Internet) to access additional services 152 provided by a cloud services provider. Examples of communication networks include a mobile network, a wireless network, a cellular network, a local area network ("LAN"), a wide area network ("WAN"), other wireless communication networks, or combinations of these and other networks. ML model generator system 10 may be administered by a service provider, such as via the Oracle Cloud Infrastructure ("OCI") from Oracle Corp.

Tenants of the cloud services provider can be organizations or groups whose members include users of services offered by the service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 158, which can be any type of device that can access network 154 and can obtain the benefits of the functionality of ML model generator system 10 of generating ML models. As disclosed herein, a "client" (also disclosed as a "client system" or a "client device") may be a device or an application executing on a device. System 100 includes a number of different types of client devices 158 that each is able to communicate with network 154.

Executing on cloud 154 are one or more ML models 125, each of which is generated by ML model generator 10. Each ML model 125 can be executed by a customer/client/organization of cloud 154, and used to generate predictions for their corresponding customers, such as whether a particular customer's invoice will be paid on time or delayed. In embodiments, an ML model 125 can be accessible to a client 158 via a representational state transfer application programming interface ("REST API") and function as an endpoint to the API. ML models 125 can be any type of machine learning model that, in general, is trained on some training data and test/validation data and then can process additional incoming "live" data to make predictions. Examples of ML models 125 include but are not limited to artificial neural networks ("ANN"), decision trees (including but not limited to ensembles such as random forest and gradient boosted trees), support-vector machines ("SVM"), Bayesian networks, etc. Training data can be any set of data capable of training ML model 125 (e.g., a set of features with corresponding labels, such as labeled data for supervised learning). In embodiments, training data can be used to train an ML model 125 to generate a trained ML model 125. In embodiments, each tenant or client has exclusive access to their corresponding ML models 125, and the models 125 are trained using only data provided by the corresponding client (i.e., other clients' data is not used to train a client's model).

Figure 2:
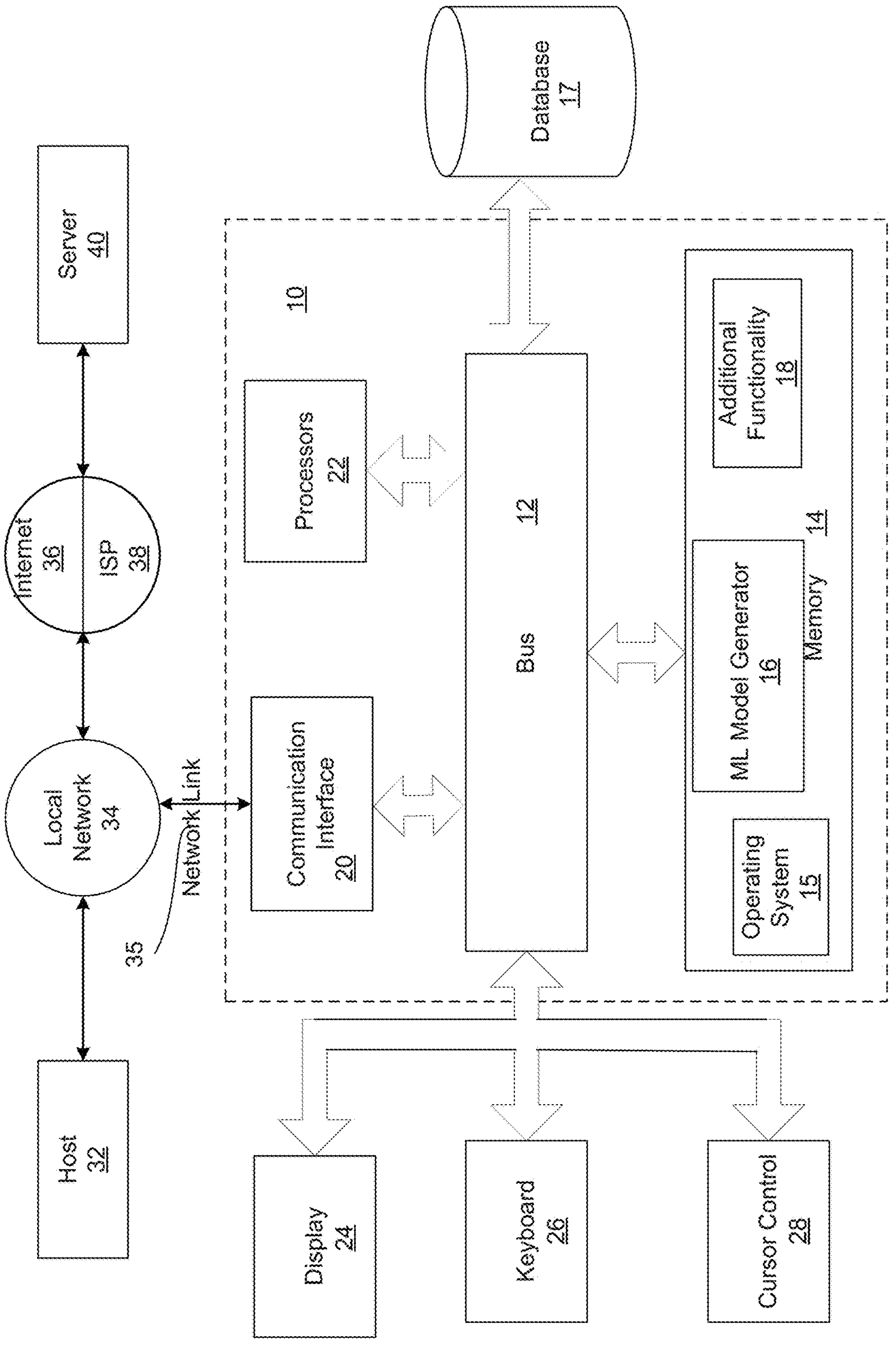
FIG. 2 is a block diagram of the ML model generator system of FIG. 1 in the form of a computer server/system in accordance with an embodiment of the present invention.

FIG. 2 is a block diagram of ML model generator system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. One or more components of FIG. 2 can also be used to implement any of the elements of FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication interface 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a ML model generator module 16 that generates one or more ML models, and all other functionality disclosed herein. System 10 can be part of a larger system. Therefore, system 10 can include one or more additional functional modules 18, such as the generated ML models, or a business intelligence or data warehouse application (e.g., "Fusion Analytics Warehouse" from Oracle Corp.) that utilizes the generated ML models. A file storage device or database 17 is coupled to bus 12 to provide centralized storage for modules 16 and 18, including training data used to generate the ML models. In one embodiment, database 17 is a relational database management system ("RDBMS") that can use Structured Query Language ("SQL") to manage the stored data.

In embodiments, communication interface 20 provides a two-way data communication coupling to a network link 35 that is connected to a local network 34. For example, communication interface 20 may be an integrated services digital network ("ISDN") card, cable modem, satellite modem, or a modem to provide a data communication connection to a corresponding type of telephone line or Ethernet. As another example, communication interface 20 may be a local area network ("LAN") card to provide a data communication connection to a compatible LAN. Wireless links may also be implemented. In any such implementation, communication interface 20 sends and receives electrical, electromagnetic or optical signals that carry digital data streams representing various types of information.

Network link 35 typically provides data communication through one or more networks to other data devices. For example, network link 35 may provide a connection through local network 34 to a host computer 32 or to data equipment operated by an Internet Service Provider ("ISP") 38. ISP 38 in turn provides data communication services through the Internet 36. Local network 34 and Internet 36 both use electrical, electromagnetic or optical signals that carry digital data streams. The signals through the various networks and the signals on network link 35 and through communication interface 20, which carry the digital data to and from computer system 10, are example forms of transmission media.

System 10 can send messages and receive data, including program code, through the network(s), network link 35 and communication interface 20. In the Internet example, a server 40 might transmit a requested code for an application program through Internet 36, ISP 38, local network 34 and communication interface 20. The received code may be executed by processor 22 as it is received, and/or stored in database 17, or other non-volatile storage for later execution.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), software-as-a-service ("SAAS") architecture, or other type of computing solution.

Figure 3:
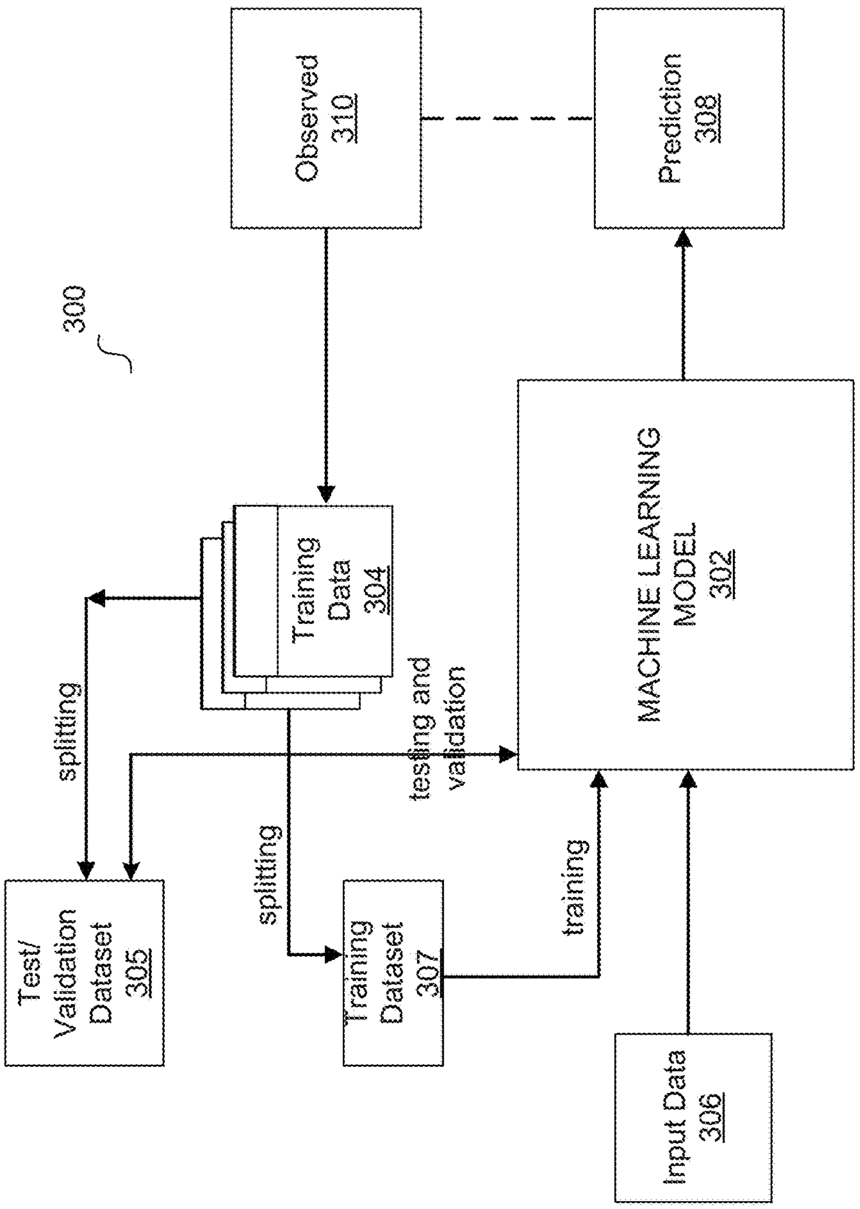
FIG. 3 is a block diagram of a prediction system according to one embodiment.

FIG. 3 is a block diagram of a prediction system according to one embodiment. System 300 includes machine learning model 302, training data 304, input data 306, prediction 308, and observed data 310. In some embodiments, machine learning model 302 can be a designed model that includes one or more machine learning elements (e.g., a neural network, support vector machine, Bayesian network, random forest classifier, gradient boosting classifier, etc.), or a single ML model. Training data 304 can be any set of data capable of training machine learning model 302 (e.g., a set of features with corresponding labels, such as labeled data for supervised learning). In embodiments, training data 304 is time dependent data. Training data 304 is split into a test/validation dataset 305 and a training dataset 307 in accordance with the functionality disclosed below. Training dataset 307 is used to train machine learning model 302 and test/validation dataset 305 is used to test and/or validate the trained ML model 302, and adjust or retrain if necessary. In embodiments, the splitting of the training data into test/validation dataset 305 and training dataset 307 is implemented by ML model generator system 10.

In some embodiments, the predictions 308 are observed 310, resulting in updating training data 304. The updated training data 304 can then be used to re-train ML model 302.

In some embodiments, the design of machine learning model 302 can be tuned during training, retraining, and/or updated training. For example, tuning can include adjusting the number of hidden layers in a neural network, adjusting a kernel calculation used to implement a support vector machine, etc. This tuning can also include adjusting/selecting features used by the machine learning model. Embodiments include implementing various tuning configurations (e.g., different versions of the machine learning model and features) while training in order to arrive at a configuration for machine learning model 302 that, when trained, achieves desired performance (e.g., performs predictions at a desired level of accuracy, run according to desired resource utilization/time metrics, etc.).

In some embodiments, retraining and updating the training of machine learning model 302 can include training the model with updated training data. For example, the training data can be updated to incorporate observed data, or data that has otherwise been labeled (e.g., for use with supervised learning). In some embodiments, machine learning model 302 can include an unsupervised learning component. For example, one or more clustering algorithms, such as hierarchical clustering, k-means clustering, and the like, or unsupervised neural networks, such as an unsupervised autoencoder, can be implemented.

In embodiments, training data 304 is composed of multiple data points and is time dependent data. For example, in one embodiment, system 300 is adapted to predict whether a customer will pay accounts receivable on time in response to one or more past purchase orders or transactions for that customer. In this embodiment, training data 304, which is historical data from past purchases/transactions, includes time dependent data of those transactions formed of multiple dates, such as purchase order approval date, transaction date, shipment date, promised receipt date, shipment receipt date, invoice payment date, etc. Some of these dates are fixed dates (e.g., purchase order approval date) and some are variable dates (e.g., shipment date).

One known method of splitting the data is randomly selecting some portion of the training data (e.g., 80%) as the training dataset 307, and the remaining portion (e.g., 20%) as the testing/validation dataset. However, for optimized model training, in such time dependent data, training data 304 should be time split (i.e., splitting according to one of the multiple dates) rather than randomly split when training data 304 is time dependent data. For example, for a customer that has made 5000 purchases/transactions over the last 5 years, one time split may be to use the oldest 4000 transactions for training data, and the most recent 1000 transactions for testing data. However, to determine the most recent 1000 transactions, one of the dates of the multiple dates that form the transaction (e.g., transaction date, shipment date, etc.) must be used as the criteria to determine the date of the transaction, or to be used to split the data.

One problem with time dependent data with multiple dates is determining which of these multiple dates should be used to split the data. Choosing among different time split dates such as purchase order approval date, transaction date, shipment date, promised receipt date, shipment receipt date, invoice payment date, etc., yield very different results for the model metrics, and result in very different distributions of the delay in payments or the delay in shipments. These distributions of delays are different across different customers and geographies, and leads to degradation in model performance. Therefore, embodiments automatically determine the optimal split date to be used in order to create models that work well over time, for all customers across all geographies and address the problem of inadvertent distributional shifts across train, test and validation datasets simply due to a sub-optimal choice of the splitting date for time splits. Embodiments determine the optimal split date that leads to a minimal distribution difference between the training dataset 307 and the testing/validation dataset 305.

Figure 4:
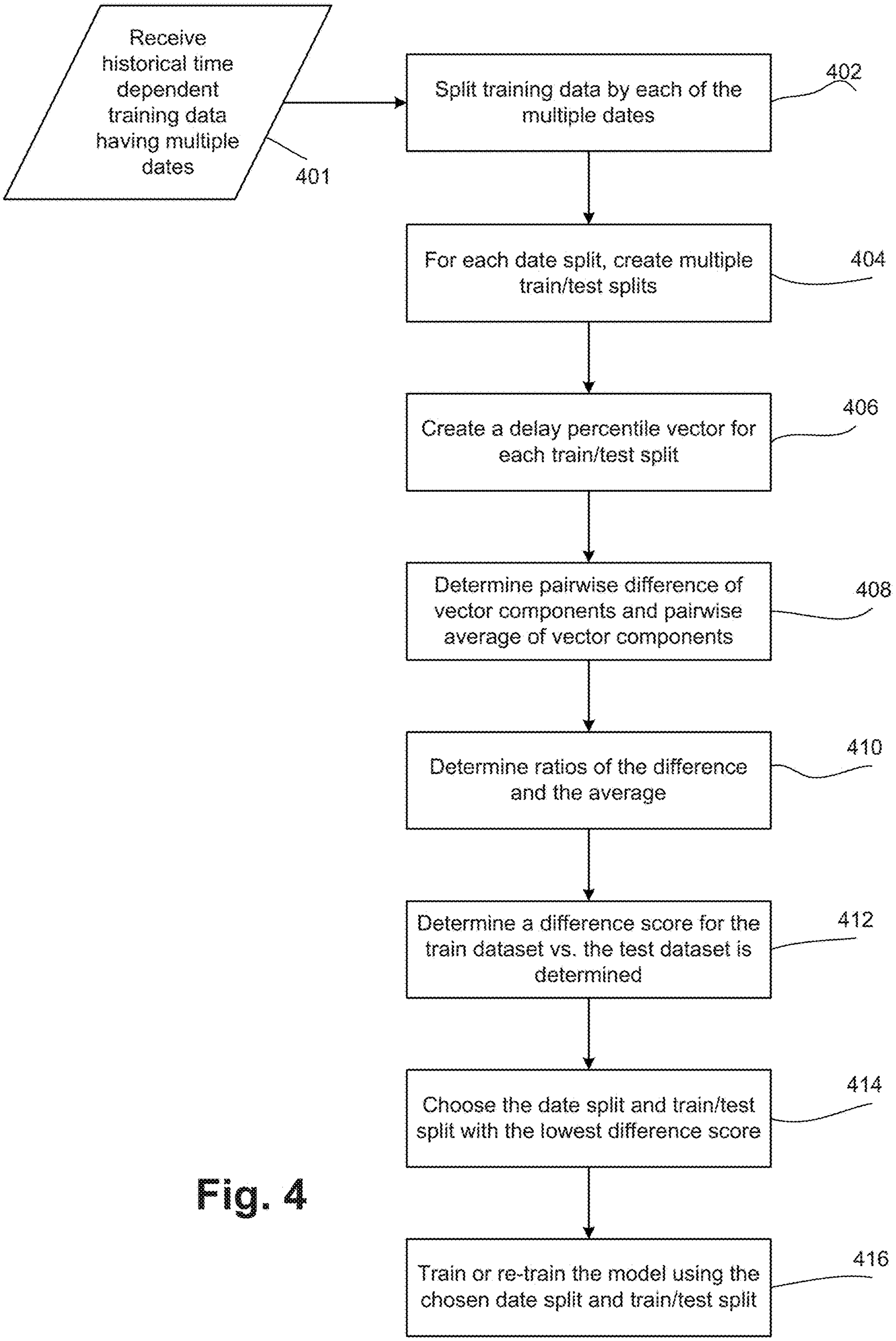
FIG. 4 is a flow diagram of the ML model generator module of FIG. 2 when determining a time split for training data in accordance to embodiments.

FIG. 4 is a flow diagram of the ML model generator module 16 of FIG. 2 when determining a time split for training data in accordance to embodiments. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality of FIG. 4 can be implemented to initially train a ML model, or to re-train a ML model that has poor metrics/performance or otherwise needs improvements.

At 401, the historical time dependent training data 304 is received for a specific customer. In one embodiment, the time dependent training data corresponds to each transaction in the form of a database table, with each column corresponding to one of the dates in the transaction (e.g., purchase order approval date, transaction date, shipment date, etc.). Time dependent data, in general, is data that corresponds to specific dates. Although the examples disclosed relate to a purchase transaction, other types of transactions can be used with embodiments of the invention, including but not limited to procurement and sales data, supply chain data, production and manufacturing data, etc.

At 402, the training data is split by each date column (i.e., each date). In embodiments, it is generally observed that date columns that are predetermined and that do not change in the course of the transaction progress (e.g., purchase order approval date, promised delivery date, etc.), referred to as "fixed" dates, are found more suitable for splitting and dates which are subject to change due to internal and external factors as the transaction progresses (e.g., item received date, invoice closed date, etc.), referred to as "variable" dates, are less suitable.

FIG. 5 illustrates a simple example of the functionality of FIG. 4 in accordance to embodiments. For 402, FIG. 5 shows data split by three of the dates: receipt date 501, promised delivery date 502, and purchase order approved date 503. In embodiments, data will be split on all fixed dates of the time dependent data, but those additional splits are not shown in FIG. 5.

At 404, for each date split, one or more train/test splits are created using one or more different ratios. For example, a "90/10" ratio split means the first 90% of the data points (corresponding to the chosen time split) of training data 304 are the training dataset 307, and the most recent 10% of data points are the test/validation dataset 305. In one embodiment, the multiple splits to find the optimal split include 90/10, 75/25 and 50/50, but the splits are not limited to these split proportions. Where compute capacity and temporal performance is critical, embodiments may search for optimality for just one split such as 90/10, or 75/25 as shown in FIG. 5. Where compute capacity allows, embodiments may broaden the search to 95/5, 90/10, 85/15, 80/20, 75/25, 70/30, etc. FIG. 5 shows only the 75/25 splits.

At 406, for each of the splits from 404, a delay percentile vector is determined in order to determine distribution shifts/differences between the training dataset and testing dataset. In one embodiment, the percentiles used are the $1^{st}$, $5^{th}$, $10^{th}$, $20^{th}$, $30^{th}$, $40^{th}$, $50^{th}$, $60^{th}$, $70^{th}$, $80^{th}$, $90^{th}$, $95^{th}$ and $99^{th}$ percentiles. The delay is the percentile of delay for the corresponding time split, such as the delivery delay, payment delay, or other target variable of interest. The amount of delay in embodiments is determined and stored in a column, including but not limited to stored items such as the delay in payment, calculated as number of days elapsed from the payment due date until the date payment was actually made, or the delay in item shipment, calculated as the number of days from the expected shipment date to the actual ship date.

In connection with column 560, when the delay in receipt of an item after it has been shipped is predicted (i.e., the target variable), the total time it takes for an item to be received after it is ordered is called "Receipt Time" ("RT"), and "MIN-RT" refers to the minimum number of days that any shipment took to be received, RT_100_PCTILE at 562 refers to the top percentile (100th percentile, or the largest value) of the RT.

Embodiments generally have one target variable of interest at a time that is predicted by the model (e.g., a prediction of a delay in payment), although several target variables may be predicted when using multi-objective, multi-target models, which include multiple models within a large model structure. The prediction of the target variables is based on the relative influence of the independent variables on changes in target variables.

FIG. 5 shows at row 511 the delay percentile vector for the training dataset 307, showing the $1^{st}$ percentile at 513, the $5^{th}$ percentile at 514, the $10^{th}$ percentile at 515, etc. Similarly, the delay percentile vector for the testing dataset 305 is shown at row 510. Each transaction that is a part of the testing dataset or the training dataset has a target variable result (i.e., the number of days of delay for the target variable (e.g., delay in payment)) which is grouped with the target variable results of all of the transactions of the training data 304. Each target variable result can be placed in a percentile relative to all of the other target variable results, and the count of these below a certain percentile is the number placed in the corresponding location in the delay percentile vector. Therefore, for example, for the date split on PO receipt date, and for the $10^{th}$ percentile, 159 of the testing dataset target variable results fall below the $10^{th}$ percentile (at 520) and 6 of the training dataset results fall below the $10^{th}$ percentile in the training dataset (at 521).

Embodiments are not limited to the above percentiles. Other embodiments can compute all 100 percentiles or could use measures of central tendency and spread, mean, standard deviation, inter-quartiles range, skewness, kurtosis, Kullback-Leibler Divergence etc. for determining the shift in distribution.

At 408, the pairwise difference of vector components and pairwise average (i.e., arithmetic or geometric mean) of vector components is determined. In FIG. 5, the pairwise differences are shown at row 530, and the pairwise averages are shown at row 531.

At 410, the pairwise determinations at 408 are normalized by dividing the pairwise difference by the pairwise average (i.e., ratio of the difference and the mean) and multiplying the ration by 100 to generate a percentage difference of each vector component. In FIG. 5, row 532 illustrates the ratios of the average difference by the average means.

At 412, a difference score for the training dataset 307 vs. the test/validation dataset 305 is determined. In one embodiment, the difference score is determined using Euclidean distance as the SQRT (Sum of Squares of Differences). In another embodiment, the difference score is determined using Manhattan distance as the Absolute Value of (the Sum of the Pairwise Difference/Pairwise Mean for All Percentiles). In FIG. 5, an example Manhattan distance is shown at 541 and an example Euclidean distance is shown at 542.

At 414, the train/test split and the date split, among all of the train/test splits and date splits, with the lowest vector length (i.e., the smallest Manhattan distance or the smallest Euclidean distance, whichever is used) is chosen as the optimal train/test split and the date split. In the simplified example of FIG. 5, the PO approved date with the 75/25 split would be chosen. In general, smaller difference scores indicate smaller shifts in distribution and larger differences indicate larger shifts.

At 416, the model is trained, or re-trained, using the chosen split and date column to generate the optimal trained model.

In embodiments, if the score chosen at 414 is above a predefined threshold, the data distribution shifts may be considered so large that stable models cannot be built. In one embodiment, the threshold is 150 for the Euclidean distance. When all scores are above the threshold, training dataset 307 can be brought closer to test/validation dataset 305, by making a larger split to be part of the training dataset (e.g., 90/10), or, for example, 95/5 or 85/15, depending on the empirical closeness of the distributions, and the functionality of FIG. 4 can be performed again. This can lead to improved scores.

Data Analytics Environment

In one embodiment, embodiments of the invention are implemented as part of a cloud based data analytics environment. In general, data analytics enables the computer-based examination or analysis of large amounts of data, in order to derive conclusions or other information from that data; while business intelligence tools provide an organization's business users with information describing their enterprise data in a format that enables those business users to make strategic business decisions.

Examples of data analytics environments and business intelligence tools/servers include Oracle Business Intelligence Server ("OBIS"), Oracle Analytics Cloud ("OAC"), and Fusion Analytics Warehouse ("FAW"), which support features such as data mining or analytics, and analytic applications.

Figure 6:
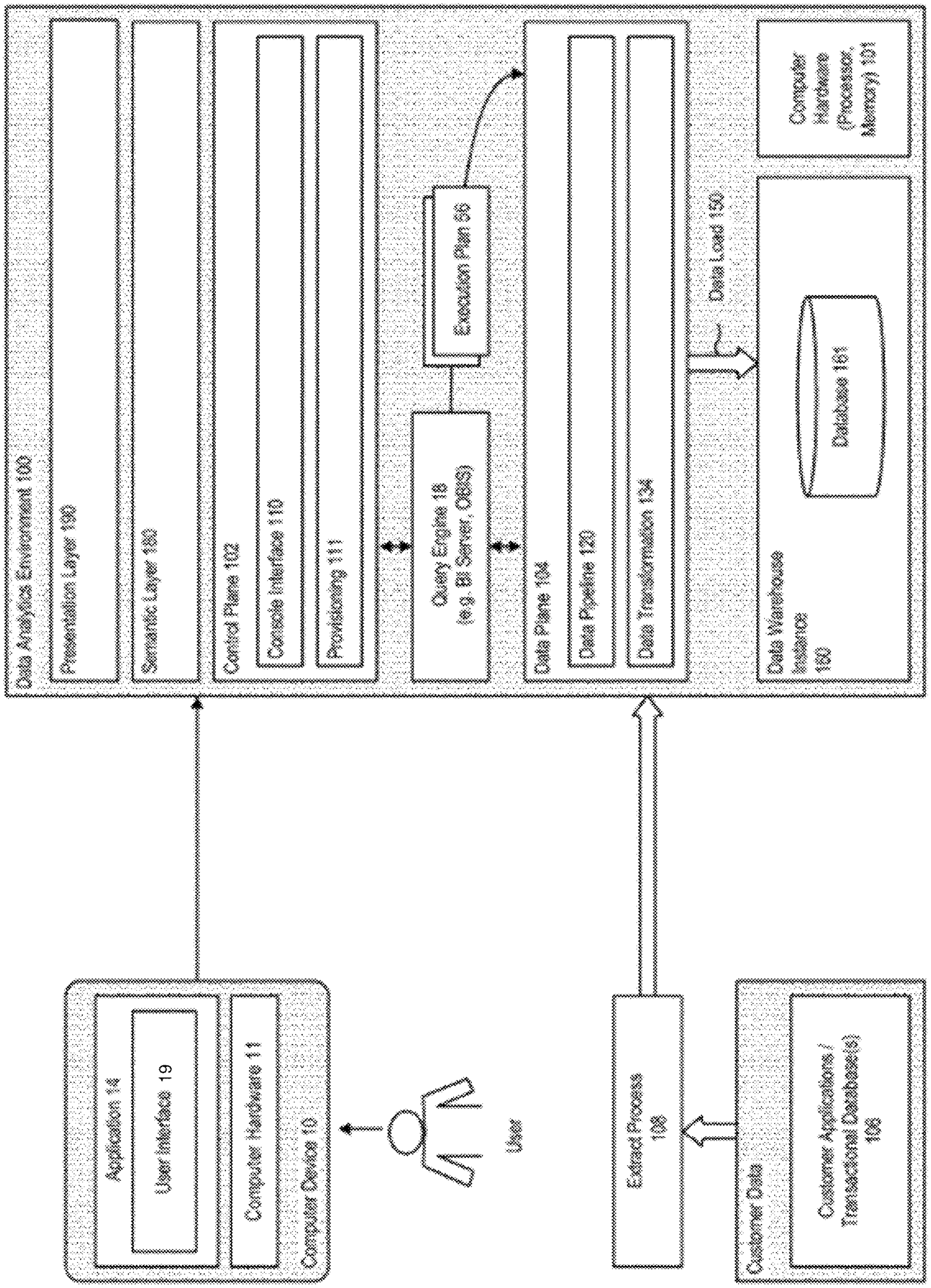
FIGS. 6-10 illustrate an example data analytics environment in accordance with an embodiment.

FIG. 6 illustrates an example data analytics environment, in accordance with an embodiment. The example embodiment illustrated in FIG. 6 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 6, and as further described herein with regard to various other embodiments, can be provided as software or program code executable by, for example, a cloud computing system, or other suitably-programmed computer system.

As illustrated in FIG. 6, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160, database 161, or other type of data source.

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface ("GUI") and/or a command-line interface ("CLI") or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an extract, transform, and load ("ETL") process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model ("KM"), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing ETL operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction of the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface ("UI") can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150 to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository ("RPD") file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators ("KPI"'s); or other type of report or interface as may be provided by products such as, for example, Oracle Analytics Cloud, or Oracle Analytics for Applications.

In accordance with an embodiment, a query engine 18 (e.g., OBIS) operates in the manner of a federated query engine to serve analytical queries within, e.g., an Oracle Analytics Cloud environment, via SQL, pushes down operations to supported databases, and translates business user queries into appropriate database-specific query languages (e.g., Oracle SQL, SQL Server SQL, DB2 SQL, or Essbase MDX). The query engine (e.g., OBIS) also supports internal execution of SQL operators that cannot be pushed down to the databases.

In accordance with an embodiment, a user/developer can interact with a client computer device 10 that includes a computer hardware 11 (e.g., processor, storage, memory), user interface 19, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan 56, that can include various child (leaf) nodes, generally referred to herein in various embodiments as RqLists, and produces one or more diagnostic log entries. Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 7:
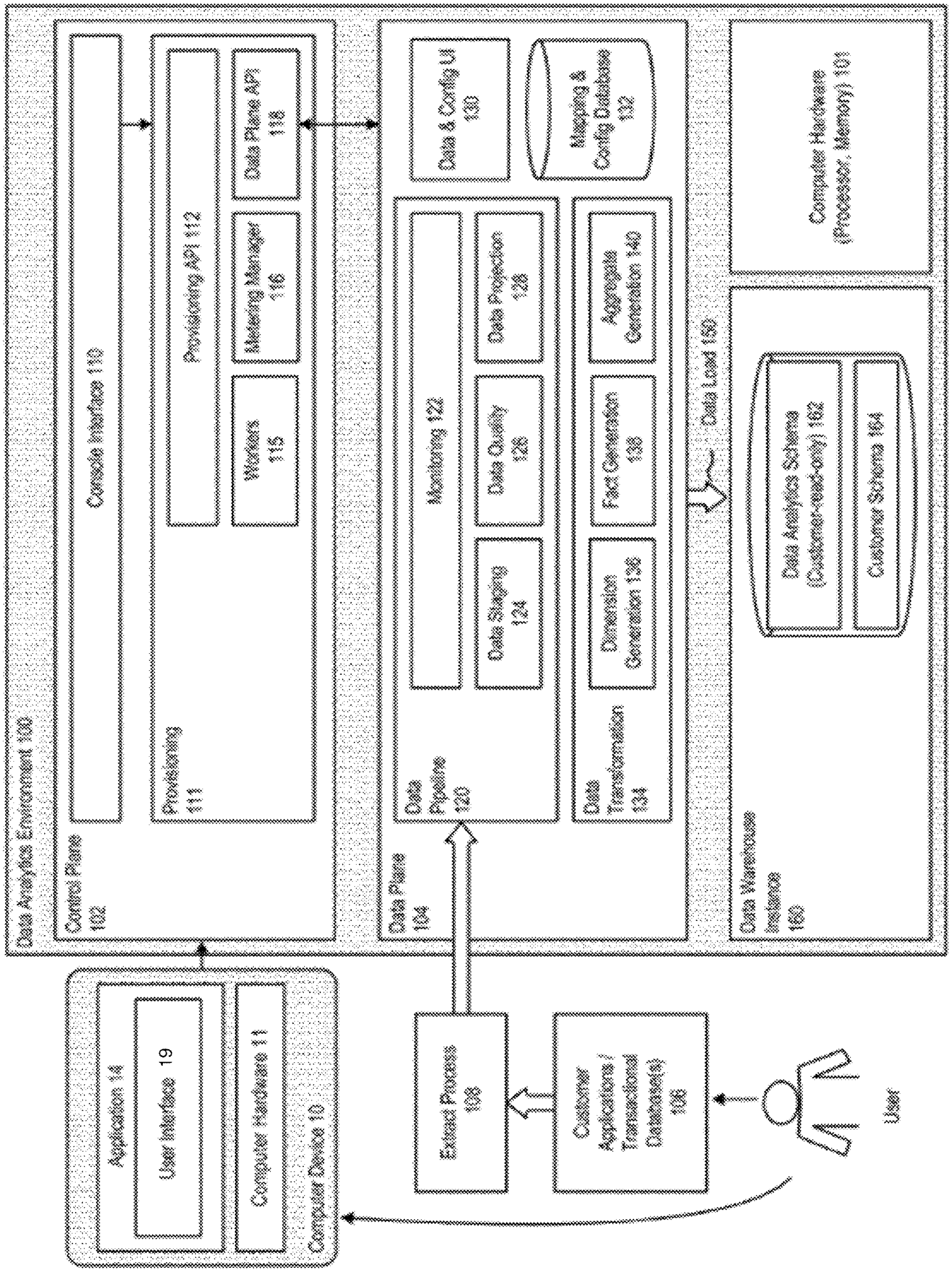

FIG. 7 further illustrates an example data analytics environment, in accordance with an embodiment. As illustrated in FIG. 7, in accordance with an embodiment, the provisioning component can also comprise a provisioning application programming interface ("API") 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 8:
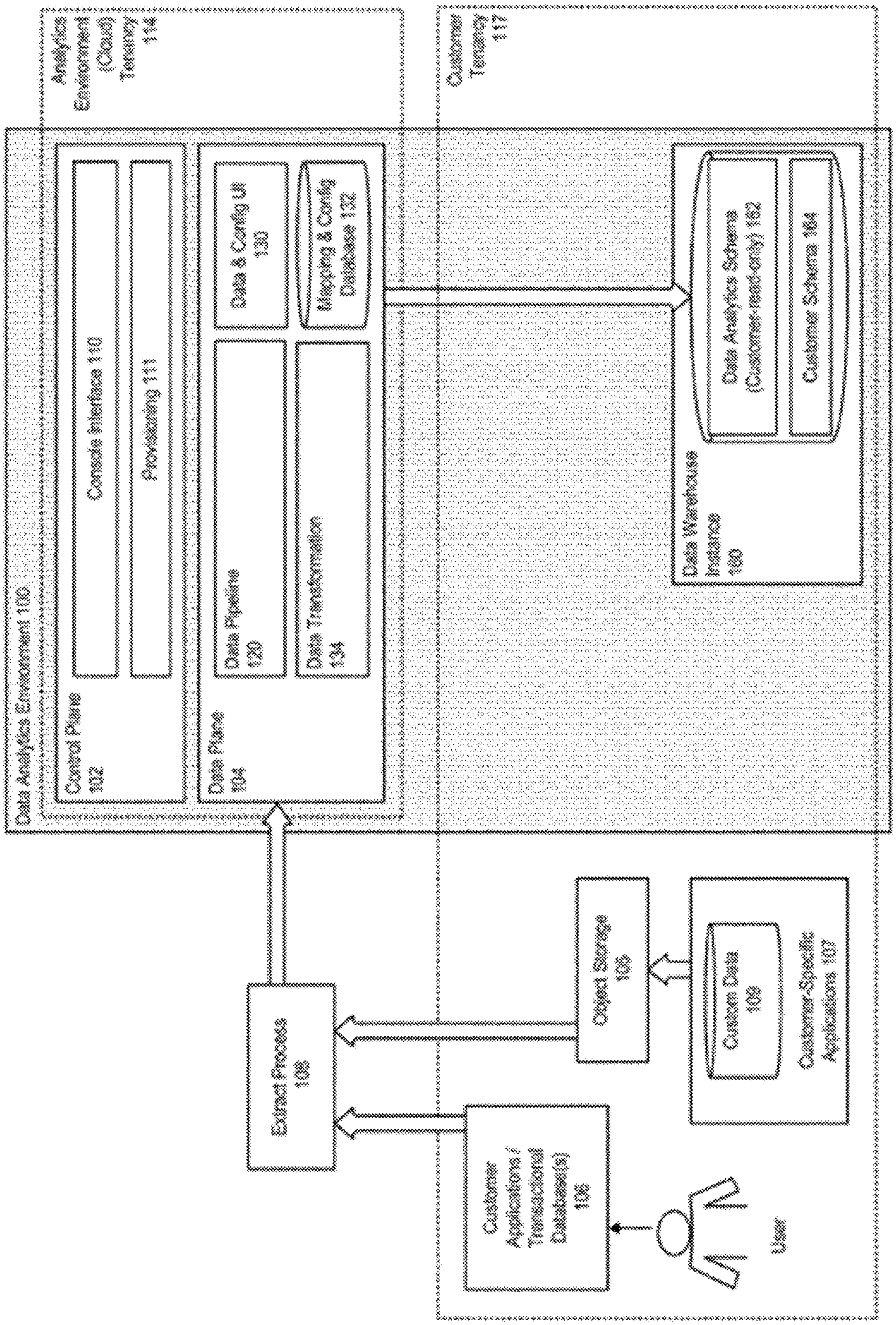

FIG. 8 further illustrates an example data analytics environment, in accordance with an embodiment. As illustrated in FIG. 8, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud ("OAC"), a user can create a data set that uses tables from different connections and schemas. The system uses the relationships defined between these tables to create relationships or joins in the data set.

In accordance with an embodiment, for each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 9:
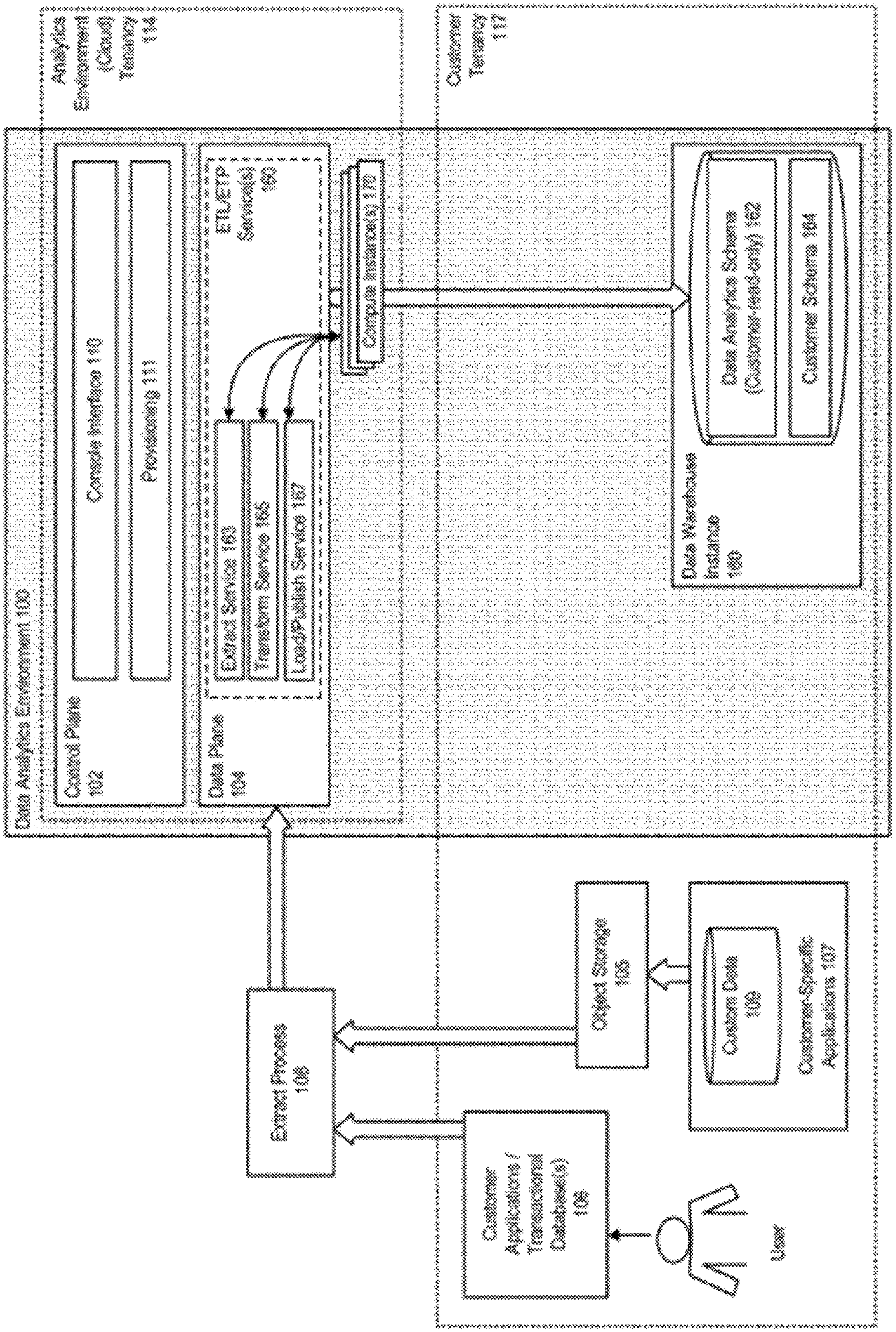

FIG. 9 further illustrates an example data analytics environment, in accordance with an embodiment. As illustrated in FIG. 9, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector ("BICC") component via a ReST call. The extracted files can be uploaded to an object storage component, such as, for example, an Oracle Storage Service ("OSS") component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 10:
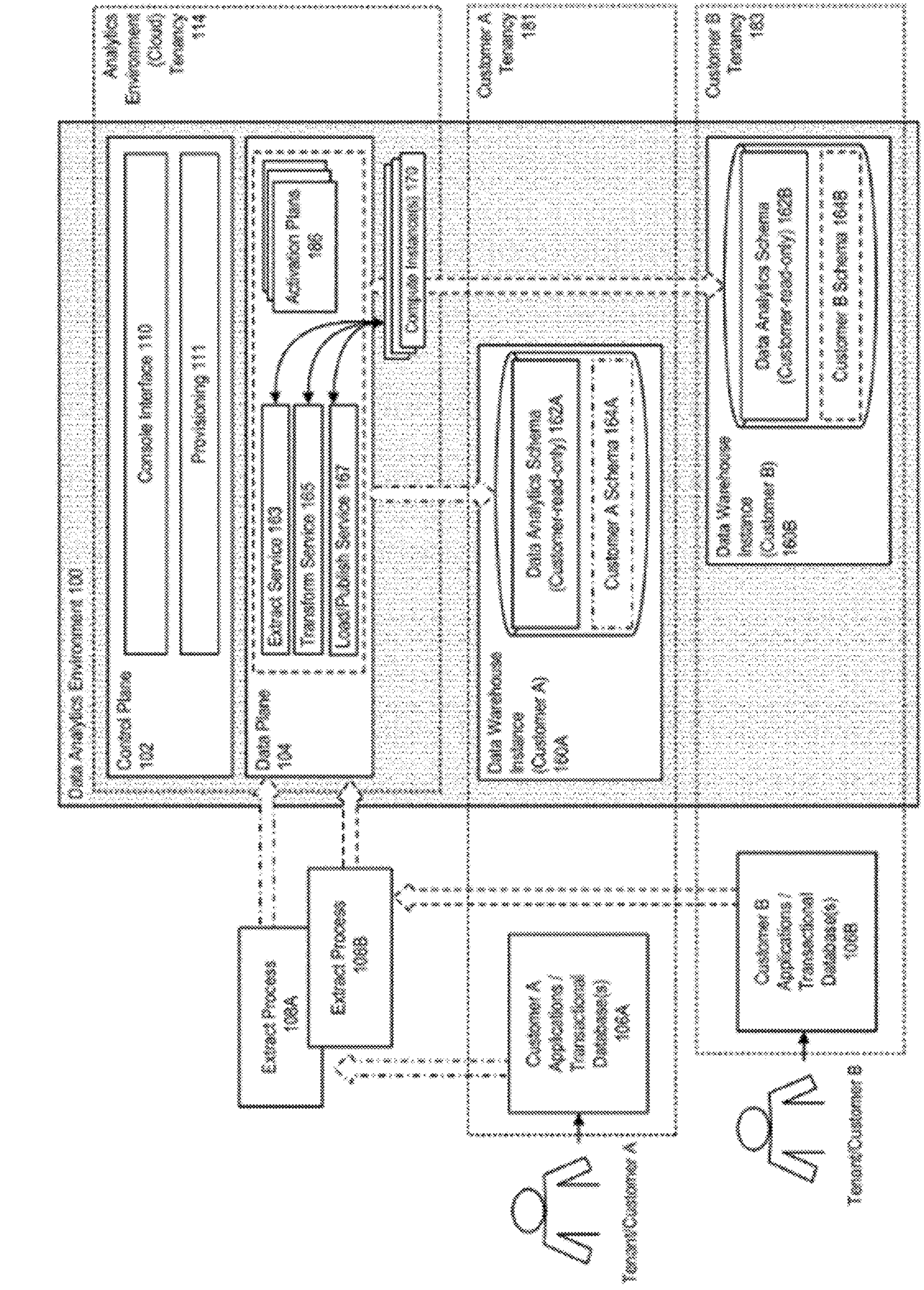

FIG. 10 further illustrates an example data analytics environment, in accordance with an embodiment. As illustrated in FIG. 10, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

As disclosed, embodiments optimize the training and testing of ML models using time dependent data by creating vector markers for the distribution of each dataset, such as percentiles or different levels of statistical moments. Embodiments use the distance between the vector markers to find a normalized vector difference, along with normalizing factors along each vector dimension. Embodiments find the size of the vector distance using different distance measures, such as Manhattan Distance or Euclidean Distance. Embodiments compare vector distances to find the variables which results in the smallest distance between target variable distributions in train, test and validation, and as a result, train the model using the chosen date split and train/test split.

Embodiments automate the process of variable selection for train/test/validation split for a time series. Embodiments create a normalized distribution shift score that works across all distributions in the field within and across one customer's data, and works across all variable types regardless of the scale or unit of the variable.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of generating a machine learning (ML) model comprising a target variable, the method comprising:

receiving training data, the training data comprising historical time dependent data, the historical time dependent data comprising a plurality of data points of transaction records, wherein each data point has a corresponding date when the data point occurred;

date splitting the training data by each of two or more of predetermined date fields of the plurality of corresponding dates to generate a plurality of candidate date split training data;

for each of the candidate date split training data, generating a plurality of train/test splits using a plurality of different train/test ratios;

for each of the plurality of train/test splits, generating a delay percentile vector for a corresponding training dataset and a corresponding testing dataset, the delay percentile vector comprising percentile values of target variable delay results for the corresponding dataset, and determining a difference of distribution between the corresponding training dataset and the corresponding testing dataset;

determining, from among the plurality of candidate date split training data and the plurality of train/test ratios, an optimized date split and an optimized train/test split having a smallest distribution of difference; and training the ML model using the optimized date split and optimized train/test split.

2. The method of claim 1, wherein the determining the difference of distribution comprises:

determining pairwise differences and pairwise averages between corresponding components of the delay percentile vectors; and normalizing the pairwise differences using the pairwise averages to determine a normalized distribution-shift score representing a difference in distribution between the corresponding training dataset and testing dataset.

3. The method of claim 2, further comprising determining a difference score for each train/test split based on the pairwise difference and the pairwise average.

4. The method of claim 3, wherein the difference score comprises a SQRT (Sum of Squares of Differences).

5. The method of claim 3, wherein the difference score comprises an Absolute Value of (a Sum of a Pairwise Difference/Pairwise Mean for All Percentiles).

6. The method of claim 3, further comprising, based on the difference scores, selecting the optimized date split the optimized train/test split.

7. The method of claim 1, wherein the training data comprises purchase order transactions, and the target variable comprises an amount of delay in payment for a corresponding purchase order transaction.

8. The method of claim 1, wherein the method is implemented by a cloud based analytics system comprising one or more software components operating as a data plane, and providing access to one or more data warehouse instances;

wherein the data plane comprises a data pipeline or process that maintains, for each of a plurality of tenants, a data analytics schema that is updated on a periodic basis by the system;

wherein the data plane includes a data transformation layer that the system uses to transform transactional data into a model format understood by the cloud based analytics system; and wherein the cloud based analytics system provides, for each tenant of the plurality of tenants, a customer schema which allows the tenant to supplement and utilize data within their own data warehouse instance, so that their resultant data warehouse instance operates as a database whose contents are partly-controlled by the tenant, and partly-controlled by the cloud based analytics system.

9. A non-transitory computer readable medium having instructions stored thereon that, when executed by one or more processors, cause the processors to generate a machine learning (ML) model comprising a target variable, the generating comprising:

receiving training data, the training data comprising historical time dependent data, the historical time dependent data comprising a plurality of data points of transaction records, wherein each data point has a corresponding date when the data point occurred;

date splitting the training data by each of two or more of predetermined date fields of the plurality of corresponding dates to generate a plurality of candidate date split training data;

for each of the candidate date split training data, generating a plurality of train/test splits using a plurality of different train/test ratios;

for each of the plurality of train/test splits, generating a delay percentile vector for a corresponding training dataset and a corresponding testing dataset, the delay percentile vector comprising percentile values of target variable delay results for the corresponding dataset, and determining a difference of distribution between the corresponding training dataset and the corresponding testing dataset;

determining, from among the plurality of candidate date split training data and the plurality of train/test ratios, an optimized date split and an optimized train/test split having a smallest distribution of difference; and training the ML model using the optimized date split and optimized train/test split.

10. The computer readable medium of claim 9, wherein the determining the difference of distribution comprises:

determining pairwise differences and pairwise averages between corresponding components of the delay percentile vectors; and normalizing the pairwise differences using the pairwise averages to determine a normalized distribution-shift score representing a difference in distribution between the corresponding training dataset and testing dataset.

11. The computer readable medium of claim 10, the generating further comprising determining a difference score for each train/test split based on the pairwise difference and the pairwise average.

12. The computer readable medium of claim 11, wherein the difference score comprises a SQRT (Sum of Squares of Differences).

13. The computer readable medium of claim 11, wherein the difference score comprises an Absolute Value of (a Sum of a Pairwise Difference/Pairwise Mean for All Percentiles).

14. The computer readable medium of claim 11, the generating further comprising, based on the difference scores, selecting an optimized splitting date of the plurality of dates and an optimized train/test split and training the ML model using the optimized splitting date and optimized train/test split.

15. The computer readable medium of claim 9, wherein the training data comprises purchase order transactions, and the target variable comprises an amount of delay in payment for a corresponding purchase order transaction.

16. The computer readable medium of claim 9, wherein the one or more processors are implemented by a cloud based analytics system comprising one or more software components operating as a data plane, and providing access to one or more data warehouse instances;

wherein the data plane comprises a data pipeline or process that maintains, for each of a plurality of tenants, a data analytics schema that is updated on a periodic basis by the system;

wherein the data plane includes a data transformation layer that the system uses to transform transactional data into a model format understood by the cloud based analytics system; and wherein the cloud based analytics system provides, for each tenant of the plurality of tenants, a customer schema which allows the tenant to supplement and utilize data within their own data warehouse instance, so that their resultant data warehouse instance operates as a database whose contents are partly-controlled by the tenant, and partly-controlled by the cloud based analytics system.

17. A cloud based machine learning (ML) model generating system, the ML model comprising a target variable, the system comprising:

one or more processors executing instructions and configured to:

receive training data, the training data comprising historical time dependent data, the historical time dependent data comprising a plurality of data points of transaction records, wherein each data point has a corresponding date when the data point occurred;

date split the training data by each of two or more of predetermined date fields of the plurality of corresponding dates to generate a plurality of candidate date split training data;

for each of the candidate date split training data, generate a plurality of train/test splits using a plurality of different train/test ratios;

for each of the plurality of train/test splits, generate a delay percentile vector for a corresponding training dataset and a corresponding testing dataset, the delay percentile vector comprising percentile values of target variable delay results for the corresponding dataset, and determine a difference of distribution between the corresponding training dataset and the corresponding testing dataset;

determine, from among the plurality of candidate date split training data and the plurality of train/test ratios, an optimized date split and an optimized train/test split having a smallest distribution of difference; and training the ML model using the optimized date split and optimized train/test split.

18. The system of claim 17, wherein the determine the difference of distribution comprises:

determine pairwise differences and pairwise averages between corresponding components of the delay percentile vectors; and normalize the pairwise differences using the pairwise averages to determine a normalized distribution-shift score representing a difference in distribution between the corresponding training dataset and testing dataset.

19. The system of claim 18, the processors further configured to determine a difference score for each train/test split based on the pairwise difference and the pairwise average.

20. The system of claim 17, further comprising a cloud based analytics system comprising one or more software components operating as a data plane, and providing access to one or more data warehouse instances;

wherein the data plane comprises a data pipeline or process that maintains, for each of a plurality of tenants, a data analytics schema that is updated on a periodic basis by the system;

wherein the data plane includes a data transformation layer that the system uses to transform transactional data into a model format understood by the cloud based analytics system; and wherein the cloud based analytics system provides, for each tenant of the plurality of tenants, a customer schema which allows the tenant to supplement and utilize data within their own data warehouse instance, so that their resultant data warehouse instance operates as a database whose contents are partly-controlled by the tenant, and partly-controlled by the cloud based analytics system.

* * * * *